Nov. 10, 1925.
T. H. ANDREWS
DEVICE FOR GAUGING AUTOMOBILE AXLES
Filed July 30, 1924
1,560,521
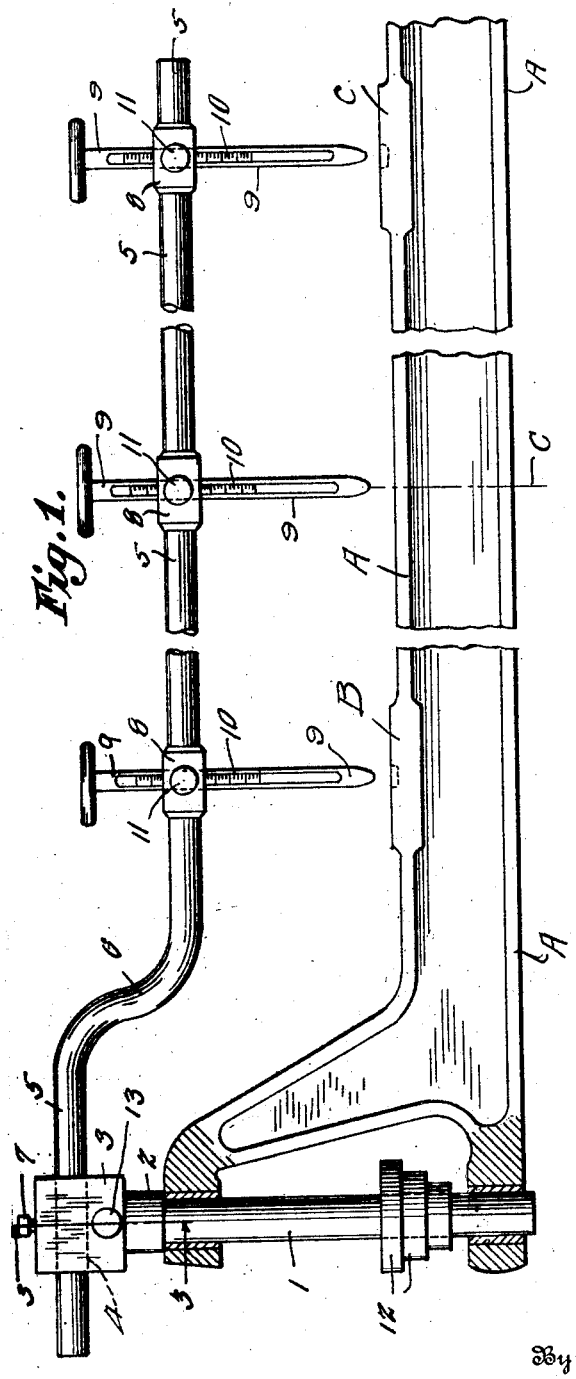
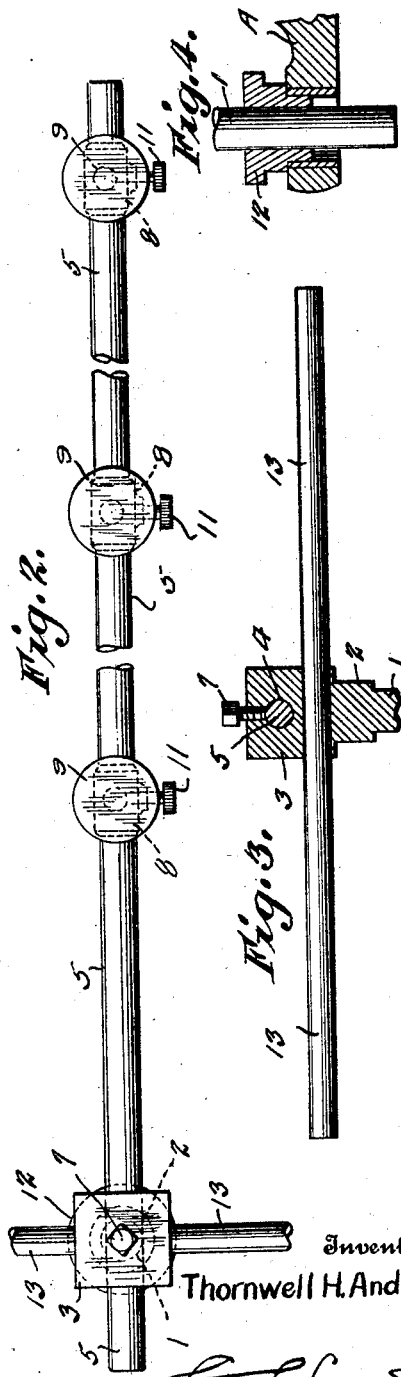
Inventor
Thornwell H. Andrews
By
Attorney Patented Nov. 10, 1925.

1,560,521

UNITED STATES PATENT OFFICE.

THORNWELL H. ANDREWS, OF CHARLOTTE, NORTH CAROLINA.

DEVICE FOR GAUGING AUTOMOBILE AXLES.

Application filed July 30, 1924. Serial No. 729,194.

*To all whom it may concern:*

Be it known that I, THORNWELL H. ANDREWS, a citizen of the United States, residing at Charlotte, in the county of Mecklenburg and State of North Carolina, have invented a new and useful Device for Gauging Automobile Axles, of which the following is a specification.

The object of my invention is to provide an improved device for the use of automobile mechanics in measuring and testing automobile axles; and to provide the novel combination and arrangement of parts disclosed in the accompanying drawings, in which—

Figure 1 is a side elevation of my invention applied to an automobile axle;

Fig. 2 is a top plan of same;

Fig. 3 is a detail sectional view of member 3 on the line 3—3 of Fig. 1; and

Fig. 4 is a detail sectional view of member 12.

Like characters of reference indicate like parts in each of the several views.

Referring to the accompanying drawings, A designates the automobile axle which is to be measured or gauged and which has the spring seat portions B. I provide a kingpin 1 having an enlarged end portion 2 and a square head 3. Head 3 is provided with a channel 4 in which is removably mounted a long metal rod 5, as shown in Figs. 1 and 2, there being a similar rod 13 in the kingpin in the opposite end of the axle, which is secured in adjusted position by a suitable set screw 7. Rod 5 is preferably provided with a bend 6, as shown in Figure 1. Also mounted in head 3 is a rod 13 extending in a direction at right angles to that of rod 5. Adjustably mounted on rod 5 are a plurality of slidable holders 8 in which are adjustably mounted the depth gauges 9 which are provided with a suitable scale 10 and may be secured in any desired adjusted position by suitable thumb screws 11. Slidably mounted on king-pin 1 is a suitable series of bushings 12.

In operating the invention, the king-pin is inserted in the axle A, as shown in Fig. 1, with the long rod 5 extending in a position over and aligned with the axle. The series of bushings 12 are also adjusted to engage the lower portion of the axle, as shown in Fig. 4. The depth gauges are moved to suitable positions over the axle and adjusted until they contact with the axle, thus making it possible to determine whether the axle is in accurate alignment or whether it requires straightening. The operator sights from one end of the axle to see if the rods 13 are in the same plane with each other. If the axle is true, the rods 13 will lie in the same horizontal plane. These rods afford an accurate check which perhaps would not be shown by use of rod 5 alone, enabling the operator to check the position of one end of the axle with the opposite end without the necessity of removing and placing it in the opposite end of the axle. The arm or rod 5 reaches from one spring block B to the other spring block C on the opposite end of the axle. The gauges 9 are employed, arranged as shown in Fig. 1, one being over the spring block B, one midway of the axle, and a third over the spring block C. The device can be used to ascertain whether or not the axle sags in the middle or either side. The device also may be used to take out twists in the axle as well as for straightening, adjusting and truing the axle. An automobile axle must be absolutely true and in line in order to make the wheel work properly; and when the axle is properly adjusted it causes the wheel to toe in slightly at the bottom. Heretofore, the gauging and straightening of axles has been done mainly by guesswork, with indifferent results.

What I claim is:

1. A device for testing axles, consisting of a king-pin adapted to be inserted in the swivel bearings of the axle, the king-pin having an enlarged head, a rod adjustably mounted in the head of the king-pin and extending longitudinally of the axle, and a plurality of depth gauges, adjustably mounted on the said rod.

2. In combination with the device described in claim 1, a rod mounted in the head of the king-pin and extending in a direction at right angles to that of the first-named rod.

3. In combination with the device described in claim 1, a series of bushings, slidably mounted on the king-pin and adapted to engage the bearings of different sizes.

4. In combination with the apparatus described in claim 1, a rod mounted in the head of the king-pin and extending at right angles to the first-named rod, and a series of bushings adjustably mounted on the lower end of the king-pin for engaging axle bearings of different sizes.

5. A device for testing axles, consisting of king-pins adapted to be attached to one end of the axle, a metal rod adjustably mounted in the head of the king-pins and extending over and in alignment with the axle, a plurality of depth gauges adjustably mounted on the rod, and a second rod also mounted in the head of each king-pin and extending in a direction at right angles to the rod carrying the depth gauges.

THORNWELL H. ANDREWS.